C. MARTIN.
COLLISION PREVENTION DEVICE.
APPLICATION FILED SEPT. 18, 1914.
1,156,366.
Patented Oct. 12, 1915.
2 SHEETS—SHEET 1.
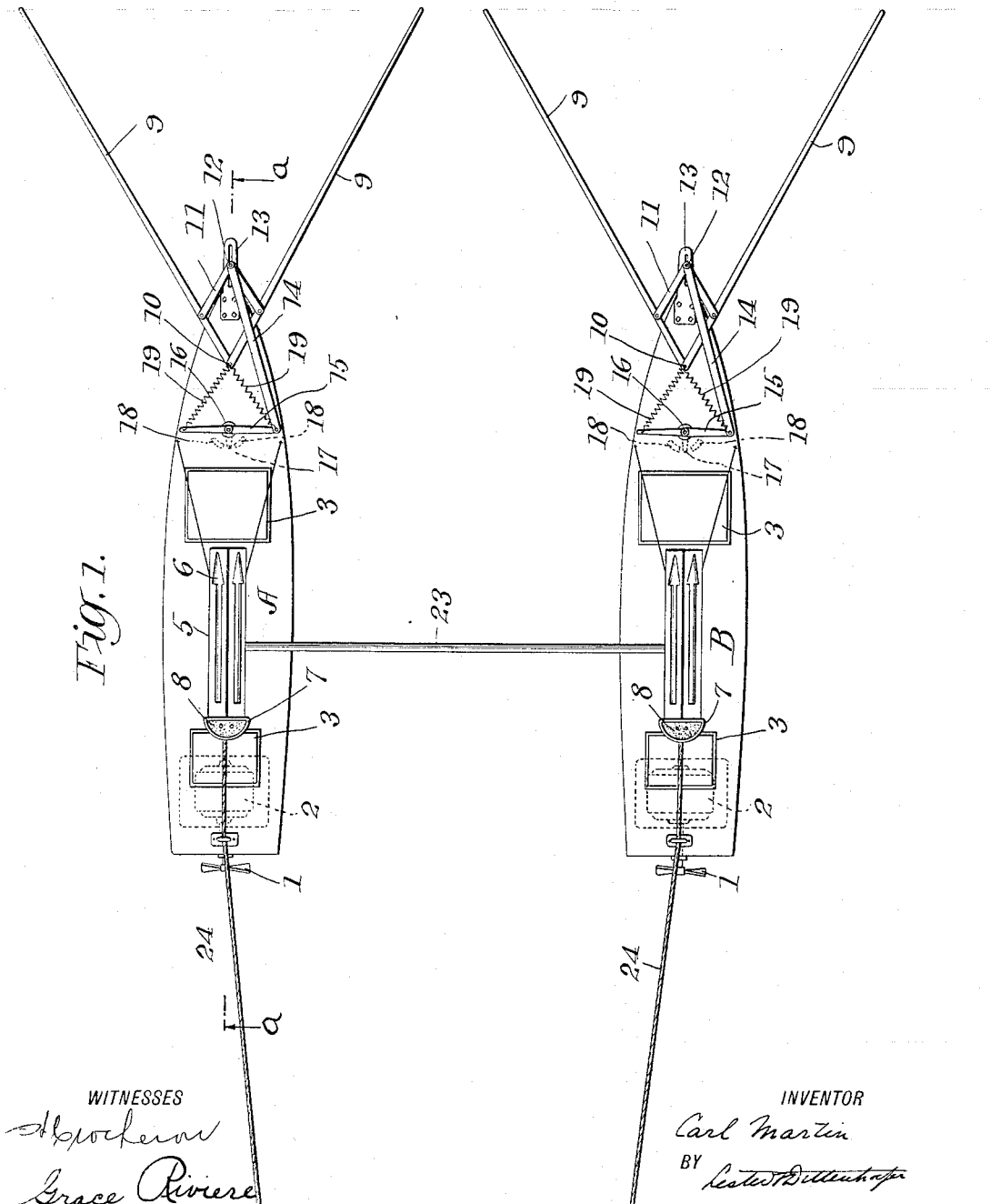
WITNESSES
INVENTOR
Carl Martin
BY
ATTORNEY C. MARTIN.
COLLISION PREVENTION DEVICE.
APPLICATION FILED SEPT. 18, 1914.
1,156,366.
Patented Oct. 12, 1915.
2 SHEETS—SHEET 2.
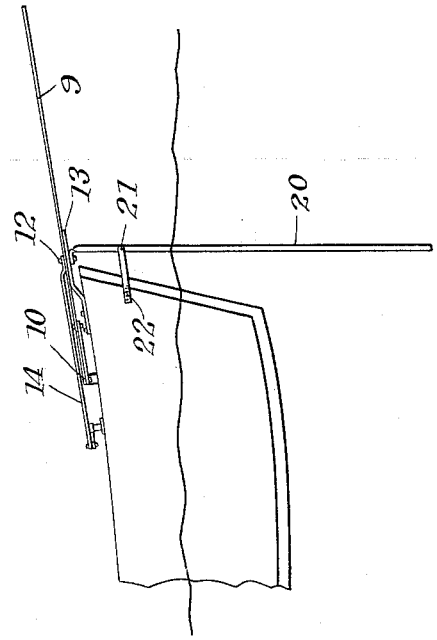
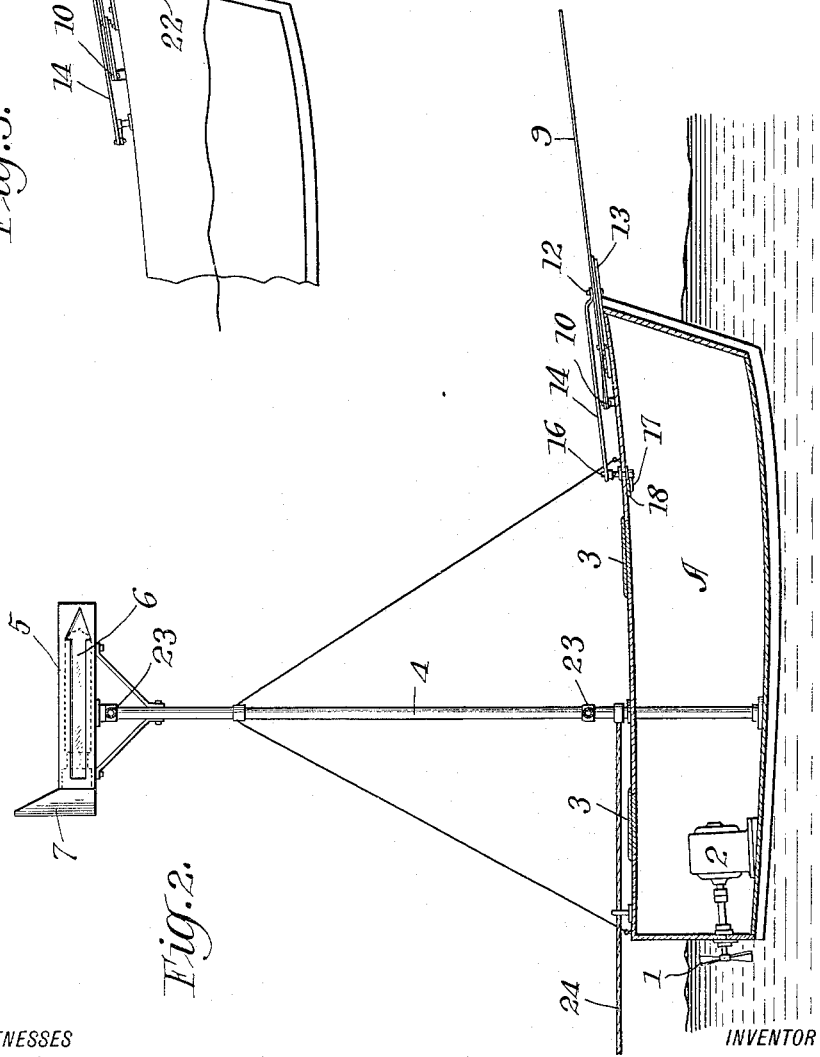
WITNESSES
INVENTOR
Carl Martin
BY
ATTORNEY

UNITED STATES PATENT OFFICE.

CARL MARTIN, OF NEW YORK, N. Y.

COLLISION-PREVENTION DEVICE.

1,156,366.  Specification of Letters Patent.  Patented Oct. 12, 1915.

Application filed September 18, 1914. Serial No. 862,260.

*To all whom it may concern:*

Be it known that I, CARL MARTIN, a subject of the German Empire, residing in the city, county, and State of New York, have invented certain new and useful Improvements in Collision-Prevention Devices, of which the following is a specification.

My invention relates to improvements in nautical signal devices of the collision prevention type.

The principal object of my invention is to provide means for safeguarding a vessel against collision with any moving or stationary obstruction disposed in the path of the vessel.

A further object of the invention is to provide means for locating the position of the obstruction with reference to the direction of travel of the vessel.

I attain the objects specified as well as others not herein enumerated by means of the device illustrated in the accompanying drawings in which:

Figure 1, is a plan view of device embodying by invention. Fig. 2, is a section in elevation on the line $a$—$a$ in Fig. 1, and Fig. 3, is a fragmentary view of the bow of one of the floats showing an attachment for detecting submerged obstructions.

The safeguarding system consists of two floats coupled together and arranged to be advanced through the water ahead of the vessel to which they are attached. Each of the floats carries feelers which on coming in contact with any obstruction operate to close a switch of an electric signal circuit. The signal may be of any desired type adapted to give the navigator warning of the impending danger of collision and may be located at any convenient place on the vessel. The twin floats are run at a sufficient distance ahead of the vessel to enable the navigator to change the course thereof in time to avoid collision.

This invention relates particularly to the construction and arrangement of the floats and of the switch operating mechanism carried thereon, and it therefore deemed unnecessary, for the purpose of this specification, to illustrate or describe the electric signal devices controlled by said switches.

Referring to the drawings, A and B represent twin floats each provided with a propeller 1 actuated by any suitable motive power such as an electric motor 2 whereby said floats are driven at a uniform rate of speed ahead of and on opposite sides of the bow of the vessel (not shown) to which they are attached. Watertight hatches 3 are provided to give access to the motors and the interior of the floats. Each of the floats is furnished with an upright 4 carrying at its top a signal lamp 5, the side walls of which are preferably formed with a forwardly pointing arrow shaped opening 6 covered with a suitably colored glass so as to indicate to an observer on an approaching vessel the location and direction of travel of the floats and of the vessel to which they are attached. A shield 7 serves to screen the lights from the rear so as to prevent the navigator from being confused by the lights of his own floats. The screen is preferably curved, as shown, to form pockets 8 in which a suitable flash powder may be placed for signal purposes.

A pair of lever arms or feelers 9 are pivoted as at 10 to the front end of each float and project outwardly therefrom as shown in Fig. 1. The two feelers of each pair are connected together by a toggle 11, which is provided at its joint with a pin 12, having its movement guided in a slot formed in the supporting piece 13 fastened to the bow of the float. Rods 14 connect the pins 12 with the pivoted cross arms 15, which latter operate switches controlling the signal devices. Each of the cross arms 15 is provided with a vertical pivot 16 which extends through the upper deck of the float and has rigidly secured to its lower end a contact maker 17. The contact maker 17 is adapted to make or break contact with the contact pieces 18, which are suitably insulated from and fastened to the undersurface of the deck of the float. The parts 17 and 18 of each switch are placed in electric circuit with a suitable signal device located on the vessel to which the floats are attached. As the signal device, in itself, does not form a part of this invention, it is not shown or described herein, it being understood that any suitable signal device may be used for the desired purpose.

Normally the arms 15 are held by means of the springs 19, in the position shown in Fig. 1, in which position the switches are open. When the feelers, carried on either float, strike against any obstruction, the consequent movement thereof will operate, through the toggle 11 and the connecting rod 14, to throw the switch into closed position, so as to complete the circuit of the signal device and to cause it to operate to give the navigator warning of the danger of collision. By reason of the fact that the two floats are arranged to run on opposite sides of the bow of the vessel to which they are attached, they will operate to give the navigator notice of the location of the obstruction, that is to say whether it is on the left or right hand side of the vessel.

In Fig. 3 I have shown a modification of my invention having an attachment for detecting submerged obstructions. This consists of a vertical feeler 20 fastened at its upper end to the pin 12 of the toggle 11, and pivoted as at 21 in a bracket 22 fastened to the bow of the float. When this feeler comes in contact with a submerged obstruction it will operate to close the switch in the manner heretofore described.

The two floats, A and B, are suitably tied together as by means of the two cross pieces 23 connecting the uprights 4. Cables 24 connect the floats to the vessel. These cables carry the wires forming the circuits of the signal device and of the electric motors which drive the floats.

I have described herein what I believe to be the best mode of applying my invention, but I am aware that various changes and modifications may be made in the arrangement and construction of the parts without departing from the scope of my invention, and I do not therefore limit myself to the precise construction herein described.

What I claim is:

1. In a collision prevention device, two floats connected together and adapted to travel in advance of a vessel on opposite sides of the bow thereof, a normally open switch carried on each float, a pair of feelers pivotally mounted on each float and extending horizontally outboard thereof at an angle to each other, and operative connections between the feelers and the switches whereby when any of the feelers strike against an obstruction the switch is thrown into closed position.

2. In a collision prevention device, two floats each provided with a propeller and a motor for driving the propeller, a standard carrying at its upper extremity a housing for a lamp, a pair of divergently extending pivoted feelers, an electrical switch for controlling a signal circuit, an operative connection between the switch and the feeler whereby upon movement of the latter the switch is thrown, and a cross piece connecting the standards of the two floats.

In testimony whereof I have hereunto affixed my signature in the presence of two subscribing witnesses.

CARL MARTIN.

Witnesses:
 LESTER F. DITTENHOEFER,
 GRACE RIVIERE.

Copies of this patent may be obtained for five cents each, by addressing the "Commissioner of Patents, Washington, D. C."